(12) United States Patent
Nakanishi et al.

(10) Patent No.: US 9,759,873 B2
(45) Date of Patent: Sep. 12, 2017

(54) METHOD FOR MANUFACTURING OPTICAL MODULE

(71) Applicant: SUMITOMO ELECTRIC INDUSTRIES, LTD., Osaka-shi, Osaka (JP)

(72) Inventors: Tetsuya Nakanishi, Yokohama (JP); Takashi Sasaki, Yokohama (JP); Yasuomi Kaneuchi, Yokohama (JP); Tetsuya Hayashi, Yokohama (JP); Osamu Shimakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/097,825

(22) Filed: Apr. 13, 2016

(65) Prior Publication Data

US 2016/0223761 A1 Aug. 4, 2016

Related U.S. Application Data

(63) Continuation of application No. PCT/JP2015/056546, filed on Mar. 5, 2015.

(30) Foreign Application Priority Data

Mar. 10, 2014 (JP) .................. 2014-046100

(51) Int. Cl.
*G02B 6/38* (2006.01)
*G02B 6/44* (2006.01)
*G02B 6/02* (2006.01)

(52) U.S. Cl.
CPC ....... *G02B 6/3885* (2013.01); *G02B 6/02042* (2013.01); *G02B 6/3843* (2013.01); *G02B 6/3871* (2013.01); *G02B 6/4403* (2013.01)

(58) Field of Classification Search
CPC G02B 6/3885; G02B 6/02042; G02B 6/3843; G02B 6/3871; G02B 6/4403
(Continued)

(56) References Cited

U.S. PATENT DOCUMENTS 5,519,799 A * 5/1996 Murakami ........... G02B 6/3825
385/66
5,519,801 A * 5/1996 Le Noane ......... C03B 37/01222
385/115

(Continued)

FOREIGN PATENT DOCUMENTS

JP H05-40207 A 2/1993
JP 2004-246203 A 9/2004
(Continued)

OTHER PUBLICATIONS

English-language translation of International Preliminary Report on Patentability (IPRP) dated Sep. 22, 2016 that issued in WO Patent Application No. PCT/JP2015/056546.

*Primary Examiner* — Ryan Lepisto
*Assistant Examiner* — Guy Anderson
(74) *Attorney, Agent, or Firm* — Drinker Biddle & Reath LLP

(57) ABSTRACT

An embodiment relates to a method for manufacturing an optical module having an MCF and two connection components, and enables rotational alignment of the MCF to be implemented with high accuracy even in short-haul optical wiring. The MCF is arranged in a region between the two connection components while an end thereof projects from one connection component. As this arrangement state is maintained, array positions of cores in the projecting end are observed from a side face and the MCF is rotationally (Continued)

aligned by a rotation grasp jig grasping the projecting end to adjust the array positions of the cores, based on the observation result.

6 Claims, 8 Drawing Sheets

(58) Field of Classification Search
USPC .................................................. 385/53–55, 59
See application file for complete search history.

(56) References Cited

U.S. PATENT DOCUMENTS

| | | | | |
|---|---|---|---|---|
| 5,706,380 | A * | 1/1998 | Le Noane | G02B 6/3803 |
| | | | | 385/147 |
| 9,151,923 | B2 * | 10/2015 | Nielson | G02B 6/46 |
| 9,158,064 | B2 * | 10/2015 | Saito | G02B 6/3885 |
| 9,213,134 | B2 * | 12/2015 | Chen | G02B 6/02042 |
| 9,256,033 | B2 * | 2/2016 | Nielson | G02B 6/3825 |
| 9,360,634 | B2 * | 6/2016 | Czosnowski | G02B 6/3834 |
| 9,366,828 | B2 * | 6/2016 | Bradley | G02B 6/3851 |
| 9,372,304 | B2 * | 6/2016 | Bradley | G02B 6/3885 |
| 2011/0229086 | A1 * | 9/2011 | Bradley | G02B 6/3885 |
| | | | | 385/78 |
| 2012/0219255 | A1 | 8/2012 | Bradley et al. | |
| 2013/0299076 | A1 * | 11/2013 | Bradley | G02B 6/3851 |
| | | | | 156/249 |
| 2014/0010500 | A1 * | 1/2014 | Saito | G02B 6/3885 |
| | | | | 385/70 |
| 2014/0219609 | A1 * | 8/2014 | Nielson | G02B 6/46 |
| | | | | 385/54 |
| 2014/0294350 | A1 * | 10/2014 | Bradley | G02B 6/3885 |
| | | | | 385/78 |
| 2015/0055923 | A1 | 2/2015 | Saito et al. | |
| 2015/0063755 | A1 * | 3/2015 | Doany | G02B 6/02042 |
| | | | | 385/59 |
| 2015/0247978 | A1 * | 9/2015 | Bradley | G02B 6/3885 |
| | | | | 156/250 |
| 2015/0323736 | A1 * | 11/2015 | Ishida | C03B 37/01222 |
| | | | | 385/126 |
| 2016/0266328 | A1 * | 9/2016 | Bradley | G02B 6/3885 |

FOREIGN PATENT DOCUMENTS

| | | |
|---|---|---|
| JP | 2013-050695 A | 3/2013 |
| JP | 2013-522680 A | 6/2013 |

* cited by examiner

METHOD FOR MANUFACTURING OPTICAL MODULE

CROSS-REFERENCE TO RELATED APPLICATIONS

This application is a continuation application of PCT/JP2015/056546 claiming the benefit of priority of the Japanese Patent Application No. 2014-046100 filed on Mar. 10, 2014, the entire contents of which are incorporated herein by reference.

TECHNICAL FIELD

The present invention relates to an optical module manufacturing method for manufacturing an optical module having connectors arranged at ends of a multi-core optical fiber (hereinafter referred to as "MCF").

BACKGROUND ART

In recent data centers and high-performance computers, communication wiring has been changed into optical wiring to increase transmission rates and transmission capacity, from the need for processing a huge amount of information. Particularly, there are increasing demands for replacing interconnection of short-haul intervals like a CPU-CPU interval, which has been electrical wiring heretofore, with optical wiring. In this regard, the MCF is expected to be applied to the optical wiring, as transmission media capable of providing a plurality of transmission channels at high density and in space-saving design. The MCF has a plurality of cores. For this reason, when connectors are arranged at the ends of the MCF, high-accuracy rotational alignment of the MCF (to rotate the MCF in the circumferential direction around the longitudinal direction of the MCF) is required in order to set array positions of the cores to predetermined array positions.

Patent Literature 1 discloses the technology of processing the MCF so as to have a noncircular cross section with a flat portion formed in a part of the outer peripheral surface, and rotationally aligning the MCF by use of the flat portion. As a commonly-known technology there is the technology of grasping the MCF by means of a grasp rotation jig from one side of the connector and rotationally aligning the grasped MCF while observing the end face of the MCF from the other side of the connector.

CITATION LIST

Patent Literature

Patent Literature 1: U.S. Unexamined Patent Publication No. 2012/0219255

SUMMARY OF INVENTION

Technical Problems

The Inventors conducted research on the above-described conventional technologies and discovered the problems described below. Namely, the foregoing technology of Patent Literature 1 requires extremely high manufacturing accuracy of relative positions between the flat portion and the cores in the cross section of the MCF in order to enhance the accuracy of the rotational alignment. In the case of the aforementioned commonly-known technology, when connectors are arranged at the two ends of the MCF, it is necessary to set the distance between the connectors to a length not less than a distance in which the grasp rotation jig can be interposed, and thus this technology is not suitable for short-haul optical wiring.

The present invention has been accomplished in order to solve the above problems and it is an object of the present invention to provide an optical module manufacturing method capable of enhancing the accuracy of the rotational alignment of the MCF even in the short-haul optical wiring.

Solution to Problems

An optical module manufacturing method according to the present embodiment is a method for manufacturing an optical module comprising: an MCF (multi-core optical fiber) having a plurality of cores; and first and second connection components attached to the MCF, and the method comprises at least an arrangement step, an array position identification step, a rotational alignment step, and a fixation step. The arrangement step is a step of arranging the MCF with respect to the first and second connection components separated from each other. In a positional relation between the first connection component and the multi-core optical fiber, the arrangement step arranges the MCF with respect to the first connection component which has a first end face facing the second connection component and a second end face opposed to the first end face, so that a part of the MCF projects from the second end face of the first connection component to an opposite side to the second connection component. In the array position identification step, array positions of the plurality of cores are identified by observation of a side face of the projecting part of the MCF, which projects from the second end face of the first connection component to the opposite side to the second connection component. In the rotational alignment step, a grasp rotation jig is used to grasp the projecting part of the MCF and, based on the identification result in the array position identification step, the MCF is rotationally aligned so as to make the array positions of the plurality of cores coincide with predetermined array positions. The fixation step is a step after the rotational alignment step and in the fixation step the MCF is fixed to each of the first and second connection components.

Advantageous Effects of Invention

The present embodiment has successfully provided the optical module manufacturing method capable of enhancing the accuracy of the rotational alignment of the MCF even in the short-haul optical wiring.

DESCRIPTION OF EMBODIMENTS

Description of Embodiment of Invention

Figure 1:
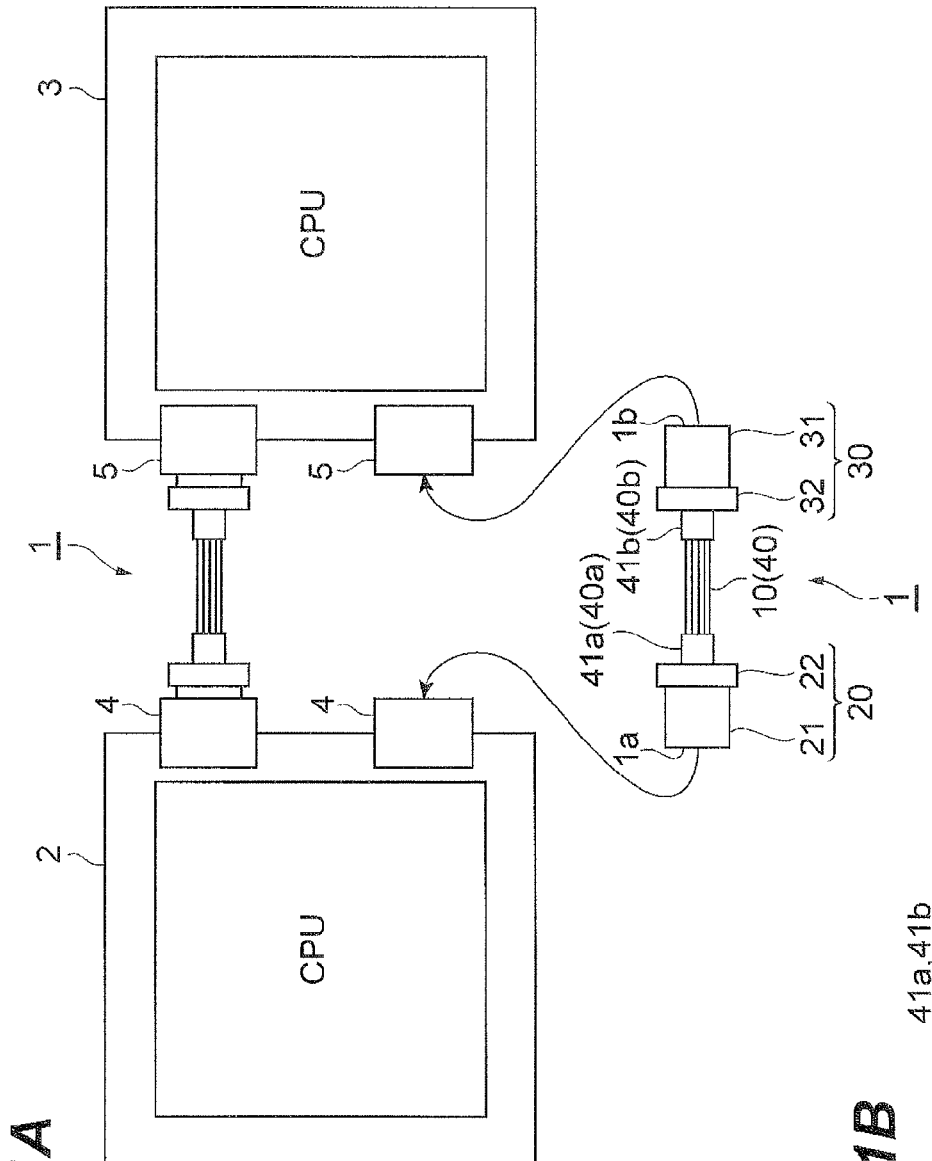
FIG. 1A is a drawing showing a configuration in which optical modules manufactured by the optical module manufacturing method according to the first embodiment are applied to interconnection between CPUs.
FIG. 1B is a drawing showing a configuration of a boot.

First, aspects of the present embodiment will be described as enumerated below.

(1) The optical module manufacturing method according to the present embodiment is a method for manufacturing an optical module which comprises an MCF (multi-core optical fiber) having a plurality of cores, and two connection components connected by the MCF. Namely, the optical module manufacturing method is to manufacture the optical module comprising the MCF and the two connection components attached to the MCF while being separated by a predetermined distance. The optical module manufacturing method, as a first aspect, comprises: an arrangement step of arranging the MCF relative to the connection components so as to connect the connection components and project to outside an interval between the connection components; an array position identification step of observing a side face portion of the MCF outside the interval between the connection components to identify array positions of the plurality of cores; a rotational alignment step of, by using a grasp rotation jig, grasping a part of the MCF outside the interval between the connection components and implement such rotational alignment as to make the array positions of the plurality of cores coincide with predetermined array positions, based on the identification result in the array position identification step; and a fixation step of fixing the MCF to the connection components, after the rotational alignment step.

The foregoing "rotational alignment" means an operation to rotate the MCF in the circumferential direction around the fiber axis (an axis extending along the longitudinal direction of the MCF and passing the center on the cross section of the MCF) in the cross section of the MCF (a plane perpendicular to the longitudinal direction of the MCF), thereby to rotate the array positions of the cores to desired positions on the cross section. When one of the two connection components is defined as first connection component and the other as second connection component, the aforementioned "interval between the connection components" means a region between the first and second connection components and arrangement region of the MCF where the MCF is arranged without provision of a substantial extra length. Furthermore, "outside the interval between the connection components" means regions between which the interval between the connection components is interposed along the longitudinal direction of the MCF, and, for example, when the first connection component is defined as reference, it means a region on the opposite side to the region between the first and second connection components and region where the part of the MCF (projecting part), which projects from the first connection component to the opposite side to the second connection component, exists. Therefore, in the arrangement step of arranging the MCF relative to the first and second connection components separated from each other, as to the positional relation between the first connection component and the MCF, the MCF is arranged relative to the first connection component having the first end face facing the second connection component and the second end face opposing the first end face, so that the part thereof projects from the second end face of the first connection component to the opposite side to the second connection component. In the array position identification step, the array positions of the cores are identified by observation of the side face of the projecting part of the MCF, which projects from the second end face of the first connection component to the opposite side to the second connection component. In the rotational alignment step, the grasp rotation jig is used to grasp the projecting part of the MCF and the MCF is rotationally aligned so as to make the array positions of the cores coincide with the predetermined array positions, based on the identification result in the array position identification step. In the fixation step after the rotational alignment step, the MCF is fixed to each of the first and second connection components. In the present embodiment, therefore, the observation of the side face of the projecting part and the grasp of the projecting part by the grasp rotation jig both are carried out on the opposite side to the second connection component with respect to the first connection component (or outside the region between the first and second connection components).

(2) As a second aspect applicable to the first aspect, in the array position identification step, the side face of the projecting part of the MCF is observed at a position within 100×D [mm] from the second end face of the first connection component (the end face outside the interval between the connection components), where D [mm] represents an outside diameter of a glass part of the MCF.

(3) As a third aspect applicable to at least either one of the first and second aspects, the optical module manufacturing method may comprise a temporary fixation step carried out after the rotational alignment step and before the fixation step. In this temporary fixation step, the projecting part of the MCF is temporarily fixed by a clamp, at a position within 150×D [mm] from the second end face of the first connection component (the end face outside the interval between the connection components), where D [mm] represents an outside diameter of a glass part of the MCF.

(4) As a fourth aspect applicable to at least either one of the first and second aspects, the optical module manufacturing method may comprise: a mounting fixation step carried out before the rotational alignment step; a temporary fixation step carried out after the rotational alignment step and before the fixation step; and a detachment step carried out after the temporary fixation step and before the fixation step. In the mounting fixation step, the first connection component is mounted on a connection component fixation jig attached to a workbench equipped with the grasp rotation jig, thereby to fix a position of the first connection component. In the temporary fixation step, the projecting part of the MCF is temporarily fixed by a clamp provided on the connection component fixation jig. In the detachment step, the connection component fixation jig is detached together with the first connection component from the workbench while the MCF is temporarily fixed by the clamp.

(5) As a fifth aspect applicable to at least any one of the first to fourth aspects, in the rotational alignment step, whether the array positions of the plurality of cores coincide with the predetermined array positions is determined based on an array image of the plurality of cores acquired by imaging the side face of the projecting part of the MCF.

(6) As a sixth aspect applicable to the fifth aspect, the MCF may have a marker arranged so as to satisfy a predetermined positional relation to the array positions of the plurality of cores. In this case, in the array position identification step, it is determined whether a position of the marker identified based on the array image coincides with a position resulting from the rotational alignment of the array positions of the plurality of cores to the predetermined array positions.

(7) As a seventh aspect applicable to at least any one of the first to sixth aspects, the MCF may be one of a plurality of multi-core optical fiber elements included in a multi-core optical fiber assembly (hereinafter referred to as "MCF assembly"). In this case, the MCF assembly has: a coated part in which outer peripheral surfaces of the respective MCF elements are coated with a coating material; and a separated part in which the plurality of multi-core optical fiber elements are separated from each other while a part of the coating material is removed. In the arrangement step, the coated part is arranged between the first and second connection components and the MCF assembly is arranged relative to the first and second connection components so that the separated part projects from the second end face of the first connection component to the opposite side to the second connection component. In the optical module manufacturing method, the array position identification step and the rotational alignment step are carried out for each of the plurality of MCF elements.

[Details of Embodiment of Invention]

Specific structures in the optical module manufacturing method according to the present embodiment will be described below in detail with reference to the accompanying drawings. It should be noted that the present invention is by no means intended to be limited to these examples presented by way of illustration only and is intended for inclusion of all changes and modifications within the meaning and range of equivalency to the scope of claims, as indicated by the scope of claims.

First Embodiment

As shown in FIG. 1A, optical modules 1 manufactured by the optical module manufacturing method according to the first embodiment are applied, for example, to optical wiring for interconnection between CPUs (Central Processing Units) 2, 3. The optical module 1 has one or more MCFs 10, and two optical connectors (connection components) 20, 30 connected through the MCFs 10. In the example of FIG. 1A, a plurality of MCFs 10 are disclosed as an MCF assembly 40 in which the MCFs are integrated by a coating material (coating for integration). The optical module may also be configured with a single MCF 10 arranged between the two optical connectors 20, 30. The MCF assembly 40 is integrally protected by boots 41a, 41b (cf FIG. 1B) in respective adjacent portions 40a, 40b adjacent to the optical connectors 20, 30, between the optical connectors 20, 30. This prevents each MCF 10 from undergoing microscopic flexure in the adjacent portions 40a, 40b.

The optical connectors 20, 30 are, for example, MT (Mechanical Transfer) connectors, each of which has a ferrule where the MCFs 10 each are inserted and has a function to fix a rotational direction of each MCF 10 (or the circumferential direction around the fiber axis AX). The inside diameter of each ferrule of the optical connectors 20, 30 is set to a size approximately equal to the outside diameter of a glass part of each MCF 10. The optical connector 20 has a tip portion 21 including one end 1a of the optical module 1 and a base portion 22 disposed on the opposite side to the one end 1a of the tip portion 21.

The tip portion 21 has a rectangular parallelepiped shape and has an end face in much the same size as an opening of an optical connector 4 of the CPU 2. This tip portion 21 is a portion that is fitted through the opening into the optical connector 4 when the optical connector 20 is connected to the optical connector 4. The base portion 22 also has a rectangular parallelepiped shape and has an end face larger than the opening of the optical connector 4. This base portion 33 is a portion that is located next to the opening outside the optical connector 4 when the optical connector 20 is connected to the optical connector 4.

The optical connector 30 has a tip portion 31 including the other end 1b of the optical module 1 and a base portion 32 disposed on the opposite side to the other end 1b of the tip portion 31. The tip portion 31 has a rectangular parallelepiped shape and has an end face in much the same size as an opening of an optical connector 5 of the CPU 3. This tip portion 31 is a portion that is fitted through the opening into the optical connector 5 when the optical connector 30 is connected to the optical connector 5. The base portion 32 also has a rectangular parallelepiped shape and has an end face larger than the opening of the optical connector 5. The base portion 32 is a portion that is located next to the opening outside the optical connector 5 when the optical connector 30 is connected to the optical connector 5.

In the present embodiment, the optical connector 4 of the CPU 2 and the optical connector 5 of the CPU 3 have the same shape and the optical connector 20 and the optical connector 30 have the same shape. Furthermore, the boot 41a and the boot 41b have the same shape. The optical connectors 20, 30 may be replaced by structures with V-grooves covered by a glass plate, capillaries, etc. as connection components having the function to fix the rotational direction of each MCF 1.0.

Figure 2:
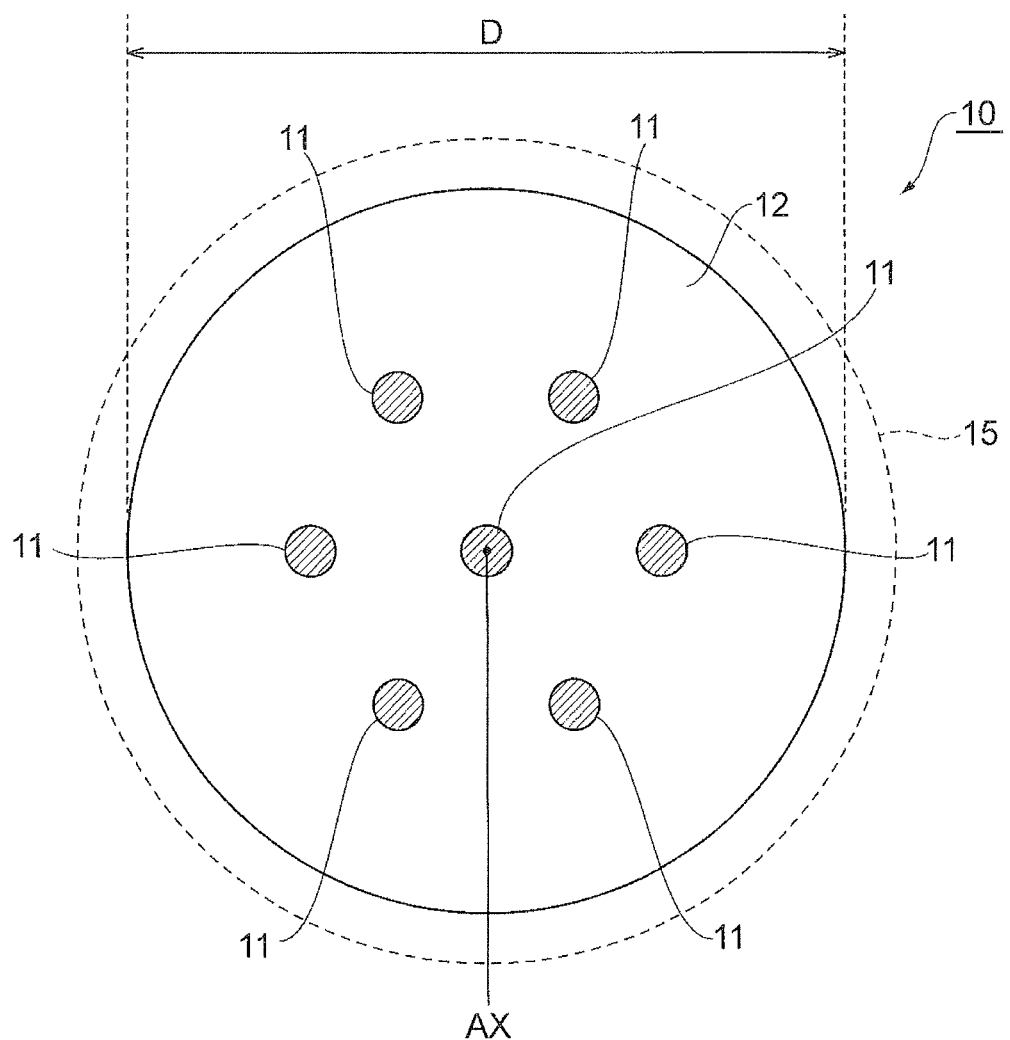
FIG. 2 is a drawing showing a cross section perpendicular to the fiber axis, of an MCF used in the optical module manufacturing method according to the first embodiment.

As shown in FIG. 2, each of the MCFs 10 has a glass part comprised of a plurality of cores 11 and a jacket 12 surrounding the periphery of each core 11; and a fiber coating 15 such as ultraviolet curable resin, provided on the outer peripheral surface of the glass part. The fiber axis AX of each MCF 10 is an axis that passes a center of a cross section of the MCF 10 and that extends along the longitudinal direction of the MCF. In each MCF 10, the plurality of cores 11 extend in the direction of the fiber axis AX. The refractive index of each of the plurality of cores 11 is different from that of the jacket 12. A cross-sectional shape of each of the plurality of cores 11 is circular. The outside diameter of the glass part of each MCF 10 is D [mm].

The optical module manufacturing method according to the present embodiment has an arrangement step, an array position identification step, a rotational alignment step, a fixation step, a cutting step, and an end face polishing step. The optical module manufacturing method according to the present embodiment will be described below with reference to FIGS. 1A, 1B, and 2 to 3.

Figure 3:
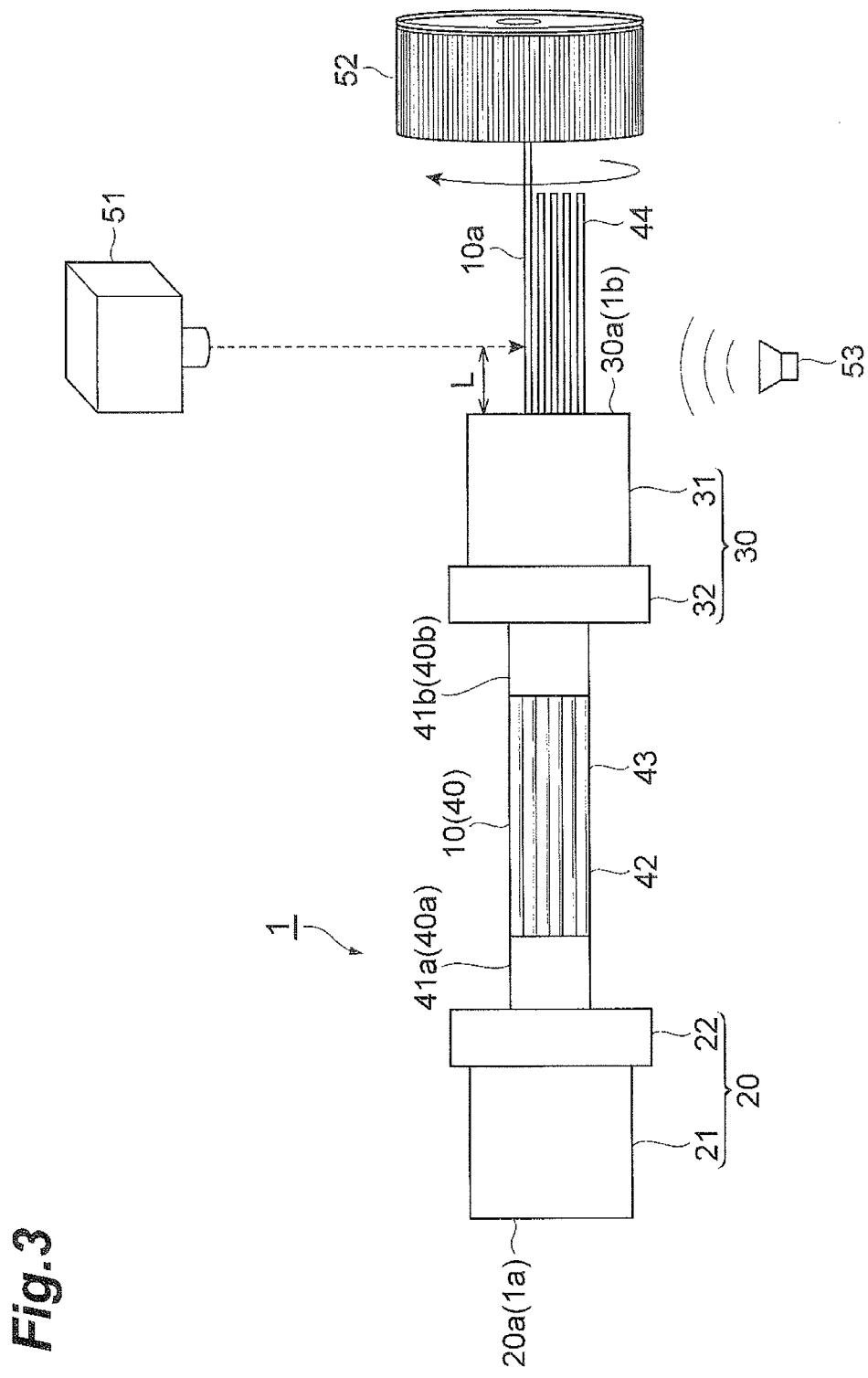
FIG. 3 is a drawing for explaining the arrangement step, array position identification step, and rotational alignment step in the optical module manufacturing method according to the first embodiment.

In the arrangement step, as shown in FIG. 3, the ends of the respective MCFs 10 are inserted from the base portion 22 side into the corresponding ferrule of the optical connector 20 until they become projecting from the tip portion 21 side. On the other hand, the other ends of the respective MCFs 10 are inserted from the base portion 22 side into the corresponding ferrule of the optical connector 30 until they become projecting from the tip portion 31 side. In the arrangement step, as described above, the optical connectors 20, 30 are connected through the plurality of MCFs 10 and the plurality of MCFs 10 are arranged relative to the optical connector 30 so that a part (projecting part 10*a*) of each MCF projects to outside an interval between the optical connectors 20, 30 (or outside an interval between the connection components).

It is noted that FIG. 3 shows a state after the steps from the arrangement step to the cutting step have already been completed for the optical connector 20. In the description hereinbelow, the rotational alignment of each MCF 10 relative to the optical connector 30 will be mainly described in detail on the assumption that the steps from the arrangement step to the cutting step also have already been completed for the optical connector 20.

In the array position identification step or in the rotational alignment step, a monitor 51 is used to capture an array image of the cores 11 in each MCF 10. Namely, the monitor 51 takes an image of a side face portion of the projecting part 10*a* of each MCF 10 located outside the interval between the optical connectors 20, 30 and on the side next to the optical connector 30, from a direction perpendicular to the fiber axis AX of the MCF 10. Then the array image is subjected to image processing, to identify array positions of the cores 11, for each MCF 10; whether the array positions of the cores 11 coincide with predetermined array positions is determined or estimated; thereafter, the rotational alignment of the MCF 10 is carried out.

It is noted herein that for each MCF 10, original targets of the rotational alignment are the array positions of the cores 11 in the end face 30*a* of the optical connector 30 outside the interval between the optical connectors 20, 30. For this reason, the side face portion of each MCF 10 at a position in the vicinity of the end face 30*a* (the side face portion of the projecting part 10*a*) is observed. When the distance from the end face 30*a* to the observation position is represented by L [min] herein, the distance L is preferably within 100×D [mm] and more preferably within 50×D [mm]. In an example, where the outside diameter D in the case of a 7-core MCF is assumed to be 0.15 mm, the distance L is within 15 mm and more preferably within 7.5 mm.

A specific method available for observing the array positions of the cores 11 in each MCF 10 from the side face portion of the MCF 10 is such a method that a light source 53 is installed on the opposite side to the monitor 51 with respect to each MCF 10, along a direction perpendicular to the fiber axis AX of each MCF 10 and that an intensity profile is measured for light transmitted by each MCF 10 out of light emitted from the light source 53. In each MCF 10, since the cores 11 have the refractive index different from that of the jacket 12, the light emitted from the light source 53 is reflected and scattered inside the MCF 10. This allows the monitor to acquire an intensity profile of transmitted light according to the array positions of the cores 11 in each MCF 10.

Whether the transmitted light intensity profile coincides with an aimed transmitted light intensity profile is then determined for each MCF 10, thereby executing the array position identification step of identifying the array positions of the cores 11. The aimed transmitted light intensity profile is a transmitted light intensity profile obtained when the array positions of the cores 11 in each MCF 10 coincide with the predetermined array positions, which can be acquired in advance.

In the rotational alignment step, a grasp rotation jig 52 is used to grasp a part of each MCF 10 outside the interval between the optical connectors 20, 30 and, based on the identification result in the array position identification step, the rotational alignment of the MCF 10 is performed so that the array positions of the cores 11 in the grasped MCF 10 coincide with the predetermined array positions, based on the identification result in the array position identification step. Specifically, while measuring the transmitted light intensity profile as described above, the rotational alignment of each MCF 10 is carried out so that the transmitted light intensity profile coincides with the aimed transmitted light intensity profile.

For example, in a case where each MCF 10 is configured so that the predetermined array positions are defined as an array wherein in a cross section perpendicular to the fiber axis AX thereof, the plurality of cores 11 are one-dimensionally arrayed in a direction perpendicular to the traveling direction of the light emitted from the light source 53, the array positions where the pitch of the cores 11 becomes maximum, are identified by image processing of the transmitted light intensity profile, and the rotational alignment is carried out so as to make the array positions of the cores 11 coincide with the identified array positions. FIG. 3 shows the case where the rotational alignment is carried out for one MCF 10, but in the case where the rotational alignment is carried out for the plurality of MCFs 10, the array position identification step and the rotational alignment step are carried out for the plurality of MCFs 10 one by one, as described above.

In the fixation step, the MCFs 10, after the rotational alignment of each MCF in the rotational alignment step, are fixed by adhesion to the optical connector 30. This step results in fixing the rotational direction of each MCF 10 relative to the end face 30*a* of the optical connector 30. When V-grooves are used as connection component, each of MCFs 10 may be fixed by such pressure as to press each of the MCFs 10 from top of the V-grooves.

In the cutting step, the projecting part 10*a* of each MCF 10 is cut. In the end face polishing step, the end face 30*a* of the optical connector 30, after the cutting of the projecting part 10*a* of each MCF 10, is polished. The end face 30*a* of the optical connector 30 after the polishing becomes the other end 1*b* of the optical module 1. Similarly, the end face 20*a* outside the interval between the optical connectors 20, 30, of the optical connector 20 after polished becomes the one end 1*a* of the optical module 1. Through this, we can obtain the optical module 1 capable of interconnecting the CPUs 2, 3. In order to enhance the accuracy of the rotational alignment, the fixation step is preferably carried out for the plurality of MCFs 10 one by one.

An MCF assembly 40 including a plurality of MCFs (MCF elements) 10 has: a coated part 43 where the outer peripheral surface of the assembly is coated with a coating material (coating for integration) 42; and a coated-fiber part 44 where the coating material 42 is removed to expose each of the MCFs 10. Each MCF 10 in the coated-fiber part 44 is in a coated-fiber state in which the fiber coating 15 is provided on the outer peripheral surface of the glass part as shown in FIG. 2. The coated-fiber part 44 is a separated part (single-fiber part) in which the plurality of MCFs 10 are separated from each other (or in a single-fiber state). The coated part 43 is, for example, in a multi-fiber cable state or cord state. Therefore, in the arrangement step, specifically, the MCF assembly 40 is arranged between the optical connectors 20, 30 so as to locate the coated part 43 between the optical connectors 20, 30 and so as to make each of the MCFs 10 in the coated-fiber part 44 project to outside the interval between the optical connectors 20, 30. Therefore, the projecting parts 10a of the respective MCFs 10 constitute the coated-fiber part 44. The plurality of MCFs 10 in the boots 41a, 41b may be in the cable state or cord state.

In the array position identification step, the monitor 51 is used to observe the side face portion of each projecting part 10a in the coated-fiber part 44 to identify the array positions of the cores 11 in each projecting part 10a. Furthermore, in the rotational alignment step, the grasp rotation jig 52 is used to grasp the projecting part 10a in the coated-fiber part 44 and the rotational alignment is performed so that the array positions of the cores 11 in the grasped projecting part 10a coincide with the predetermined array positions, based on the identification result in the array position identification step. When the coated part 43 of the MCF assembly 40 is in the multi-fiber cable state, the MCF assembly 40 preferably has a structure in which each of the MCFs 10 can freely rotate in the cable by use of a loose tube or the like.

According to the optical module manufacturing method according to the present embodiment, as described above, for each of the MCFs 10, the projecting part 10a is observed in the state in which the MCF 10 is arranged so that the part thereof (projecting part 10a) projects to outside the interval between the optical connectors 20, 30, and the rotational alignment is carried out while grasping the observed projecting part 10a. Since the rotational alignment is carried out using the projecting part 10a grasped in this manner, the accuracy of the rotational alignment of each MCF 10 can be enhanced even in the short-haul optical wiring, independent of the distance between the optical connectors 20, 30. Therefore, the present embodiment can be suitably applied to the short-haul optical wiring not more than several cm, without having to be limited only to the interconnection between the CPUs 2, 3. Furthermore, it is recently assumed in economic terms to adopt a scheme in which optical transmission is performed while a plurality of inexpensive optical transceivers are arranged in parallel, and in application of one or more MCFs 10 as its optical transmission path, the optical module 1 by the optical module manufacturing method according to the present embodiment can also be suitably used.

Figure 4:
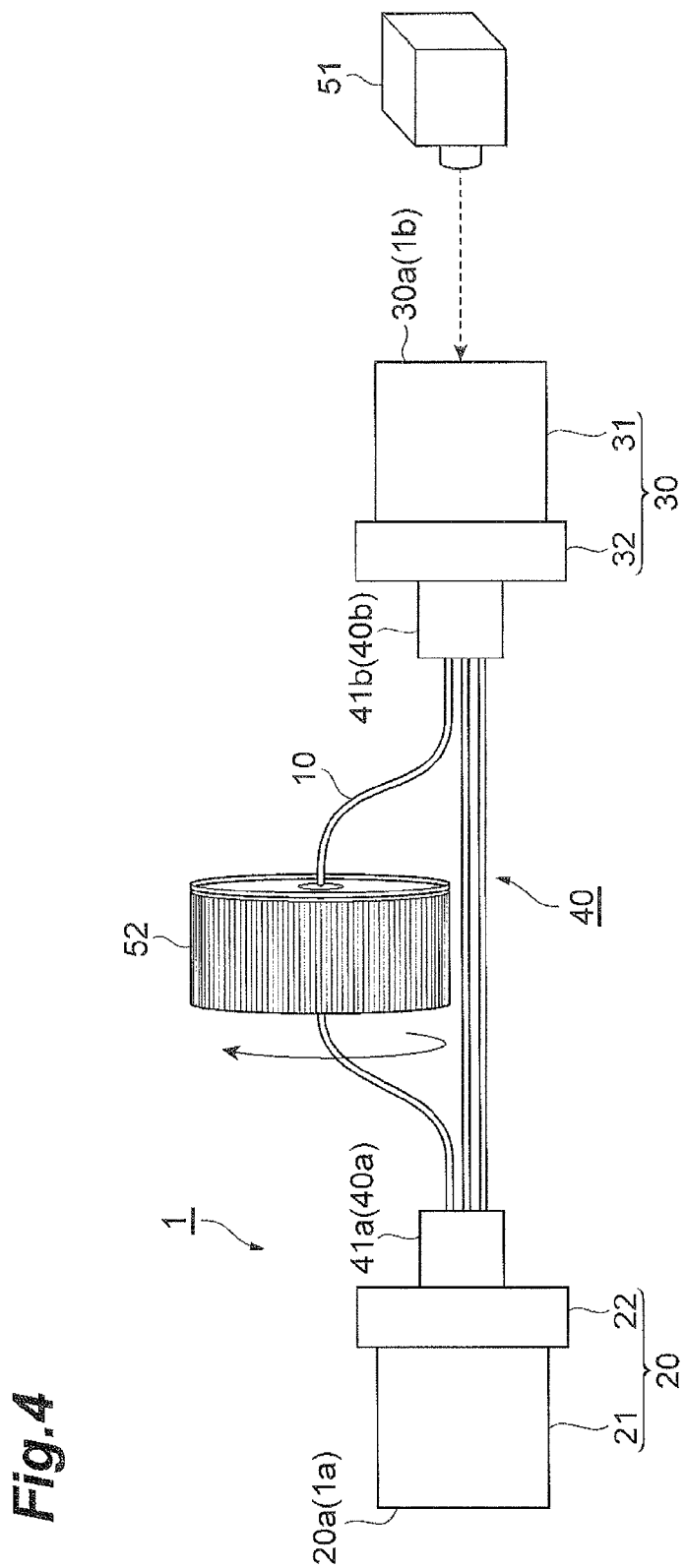
FIG. 4 is a drawing for explaining the rotational alignment in the optical module manufacturing method according to the conventional technology.

In the conventional technology, as shown in FIG. 4, the plurality of MCFs 10 are arranged so as not to project to outside the interval between the optical connectors 20, 30. When the rotational alignment is performed for each MCF 10 relative to the optical connector 30, the end face 30a of the optical connector 30 is first observed by the monitor 51 from the direction of the fiber axis AX of each MCF 10. Then the rotational alignment is carried out while each of the MCFs 10 is individually grasped by the grasp rotation jig 52 between the optical connectors 20, 30. Therefore, the conventional technology necessitates a space enough to interpose the grasp rotation jig 52 between the optical connectors 20, 30.

For preventing the grasp rotation jig 52 from interfering with the MCFs 10 other than the MCF 10 as grasped target, an extra length is needed for the grasped target MCF 10 or for the other MCFs 10. Although the example of FIG. 4 shows the case where the rotational alignment is performed for only one MCF 10, the extra length is also needed for the other MCFs 10 when the rotational alignment is carried out for the other MCFs 10. Furthermore, when the MCF assembly 40 is in the multi-fiber cable state or cord state, it is necessary to strip off the coating material 42 (cf. FIG. 3), for execution of the rotational alignment.

In contrast to it, the optical module manufacturing method according to the present embodiment is configured to perform the rotational alignment of each MCF 10 by use of the projecting part 10a of the MCF 10 located outside the interval between the optical connectors 20, 30. For this reason, even in the case where the MCF assembly 40 is in the cable state or cord state in which it is coated with the coating material 42 between the optical connectors 20, 30, there is neither the need for stripping off the coating material 42 between the optical connectors 20, 30 nor need for touching the other projecting parts 10a for the rotational alignment of a certain projecting part 10a, in the coated-fiber part 44 where the coating material 42 is excluded. Therefore, mechanical reliability of the MCF assembly 40 forming the manufactured optical module 1 is less likely to degrade.

In the optical module manufacturing method according to the present embodiment, the array position identification step is preferably configured to observe the side face portion of each MCF 10 (the side face portion of the projecting part 10a) at the position within 100×D [mm] from the end face 30a of the optical connector 30 outside the interval between the optical connectors 20, 30 and more preferably to observe the side face portion of each MCF 10 at the position within 50×D [mm] from the end face 30a. This allows us to observe the rotational alignment state approximately equivalent to the rotational alignment state of MCF 10 in the end face 30a and to perform the rotational alignment with high accuracy.

The reason why the preferred range of observation position widens depending upon the magnitude of the outside diameter D of the glass part of each MCF 10 as described above is that bending rigidity of the MCF 10 increases with increase in magnitude of the outside diameter D. Namely, since the bending rigidity of each MCF 10 increases with increase in the outside diameter D, it becomes possible to keep smaller rotational deviation as deviation between a rotational angle of each MCF 10 at the observation position and a rotational angle of each MCF 10 at the end face 30a. In this manner the rotational deviation is also affected by frictional force depending upon a clearance to each MCF 10 in the optical connectors 20, 30 (difference between the inside diameter of each ferrule in each of the optical connectors 20, 30 and the outside diameter D of the glass part of each MCF 10); for example, the rotational deviation tends to increase with increasing clearance, but the rotational deviation can be kept not more than 1° as long as the distance is within 100×D [mm].

In the present embodiment, each projecting part 10a is the coated-fiber part 44 where the MCF 10 is exposed. When this projecting part 10a is grasped by the grasp rotation jig 52, the surface of the MCF 10 at the grasped location may be covered by an elastic material. This makes each MCF 10 less likely to be broken or damaged by the grasp rotation jig 52.

When the structures with V-grooves pressed by a glass plate are used as connection members instead of the optical connectors 20, 30, there is no need for inserting the end of each MCF 10 into the ferrule. In this case, the coating material 42 is removed from only a portion to be fixed in the V-groove and the projecting part of each MCF 10 can be kept as covered by the coating material 42. Therefore, each MCF 10 in this case also becomes less likely to be broken or damaged by the grasp rotation jig 52.

Figure 5:
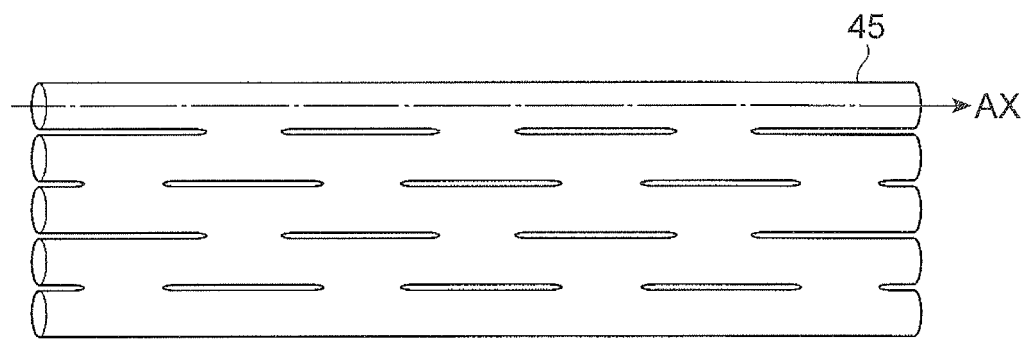
FIG. 5 is a drawing showing a configuration of a coated-fiber ribbon.

As shown in FIG. 5, a coated-fiber ribbon 45, which is a ribbon-like assembly of a plurality of MCFs 10 while these MCFs 10 are bundled in a one-dimensional array state, may be adopted as the MCF assembly 40. Since in the coated-fiber ribbon 45 the order of coated fibers is fixed, it is easy to manage the coated fibers and thus it is favorable. Furthermore, the coated-fiber ribbon 45 has an intermittent ribbon structure in which the coated fibers (fiber coatings of adjacent MCFs) are intermittently bonded to each other. In this case, it is easy to liberate residual stress in the rotational direction occurring on the base portion 22, 32 side of the optical connector 20, 30 due to the rotational alignment, and thus it is favorable. The coated-fiber ribbon 45 does not have to be limited only to that having the intermittent ribbon structure but it may also be one without the intermittent ribbon structure.

Second Embodiment

Figure 6:
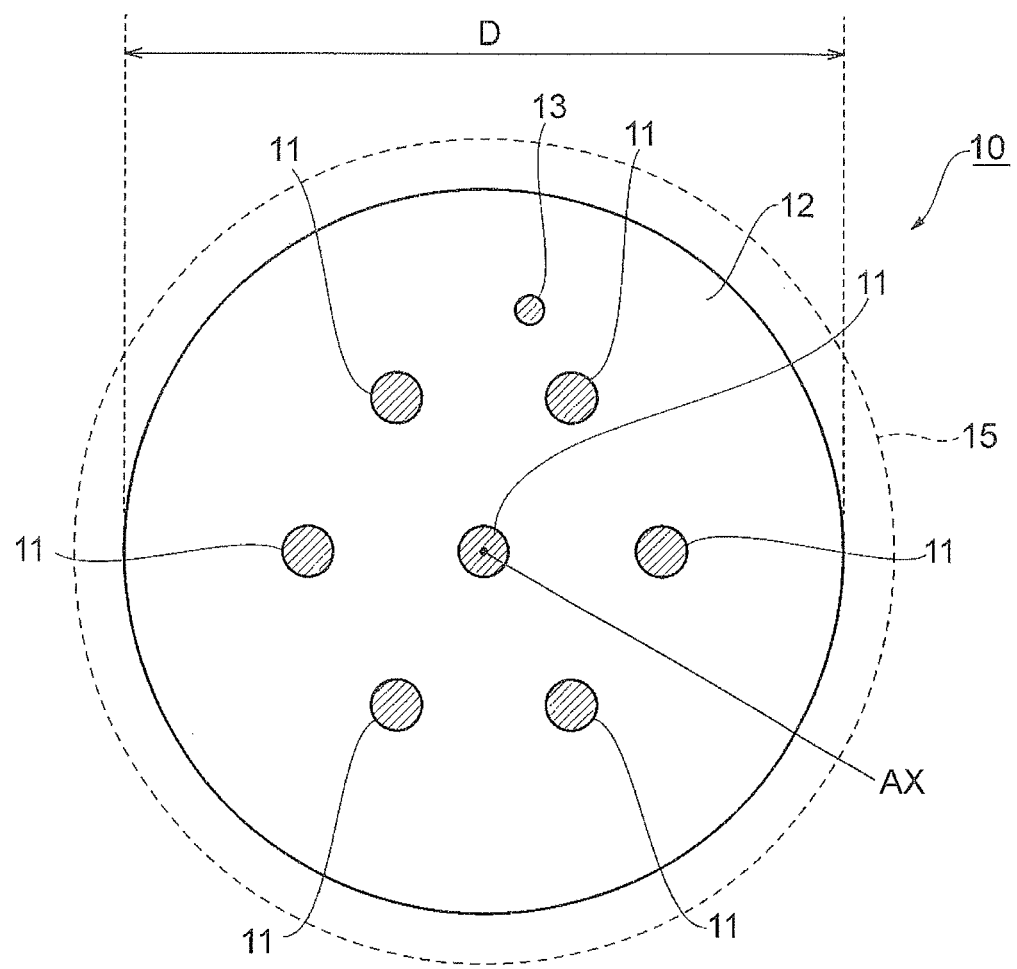
FIG. 6 is a drawing showing a cross section perpendicular to the fiber axis, of an MCF used in the optical module manufacturing method according to the second embodiment.
Figure 7:
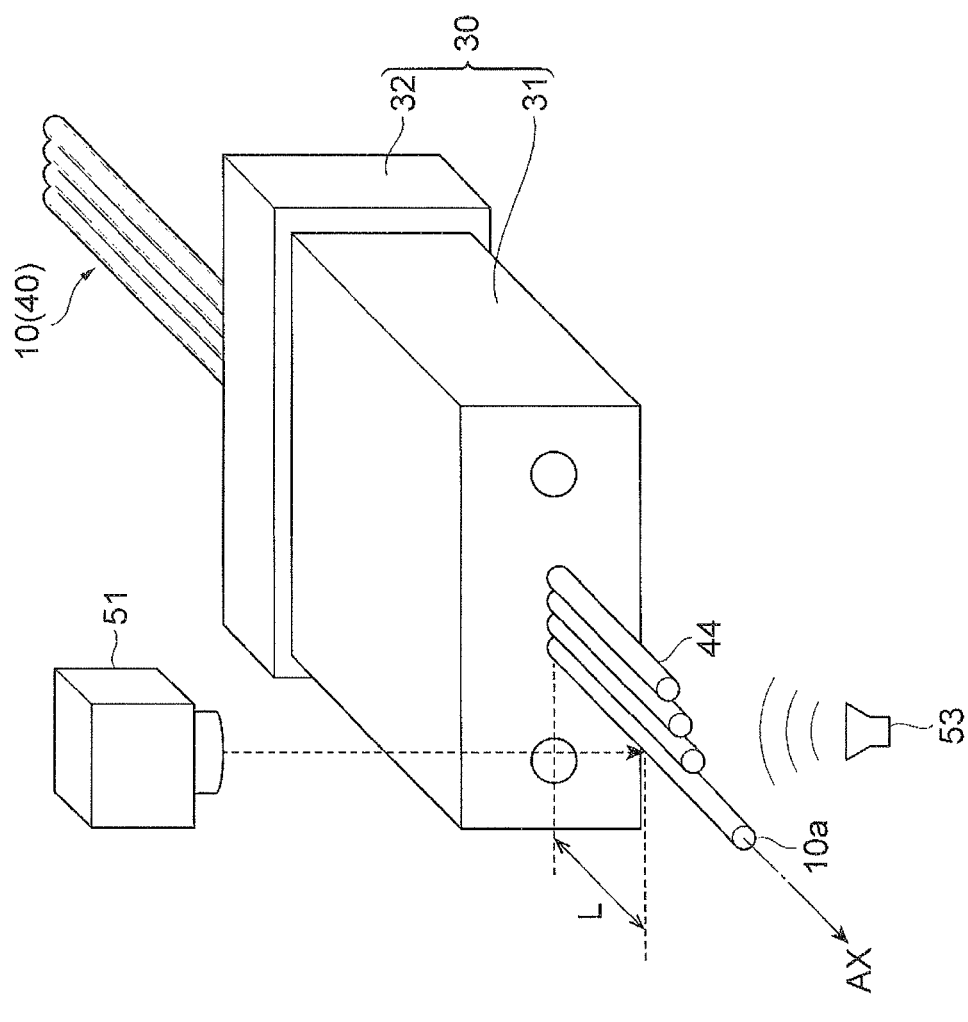
FIG. 7 is a drawing for explaining the array position identification step and rotational alignment step in the optical module manufacturing method according to the second embodiment.

As shown in FIGS. 6 and 7, the optical module manufacturing method according to the second embodiment is different from the optical module manufacturing method according to the first embodiment in that each MCF 10 (FIG. 6) has a marker 13 at a predetermined position with respect to the array positions of the cores 11. The marker 13 has the refractive index different from those of the cores 11 and the jacket 12. This improves distinguishability of the marker 13. The installation position of the marker 13 is set to a position close to the outer peripheral surface of each MCF 10, thereby facilitating the observation from the side face portion with the monitor 51, and the marker moves more with the same rotational angle than in the case where it is located at a position far from the outer peripheral surface; therefore, it improves the identification accuracy of the array positions in the array position identification step. FIG. 7 shows the same configuration as FIG. 3 does, as the configuration on the optical connector 30 side, and the configuration on the optical connector 20 side in the present embodiment is also the same as that in FIG. 3.

In the array position identification step in the optical module manufacturing method according to the present embodiment, for each MCF 10, the position of the marker 13 is identified by image processing and it is determined whether the position of the marker 13 coincides with the position of the marker 13 located when the array positions of the cores 11 are set at the predetermined array positions.

In the present embodiment, each MCF 10 has the marker 13 at the predetermined position with respect to the array positions of the cores 11 (FIG. 6), thereby improving the identification accuracy of the array positions in the array position identification step. As a result, the accuracy of the rotational alignment of each MCF 10 can be further enhanced even in the short-haul optical wiring. It is noted herein that in the present embodiment each MCF 10 has one marker 13 but it may have two or more markers.

Third Embodiment

The optical module manufacturing method according to the third embodiment is different from the optical module manufacturing method according to the first embodiment in that the present method further has an attachment step and a mounting fixation step before the arrangement step, and a temporary fixation step and a detachment step after the rotational alignment step and before the fixation step. Namely, the optical module manufacturing method according to the third embodiment has the attachment step, mounting fixation step, arrangement step, array position identification step, rotational alignment step, temporary fixation step, detachment step, fixation step, cutting step, and end face polishing step.

Figure 8A:
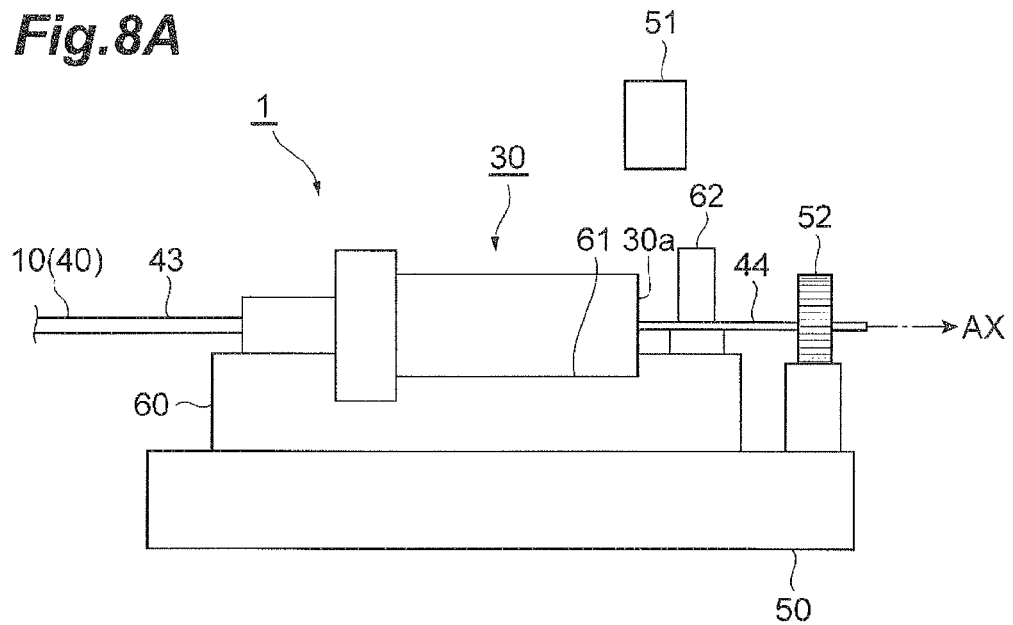
FIG. 8A is a drawing for explaining steps from an attachment step to the rotational alignment step in the optical module manufacturing method according to the third embodiment.

As shown in FIG. 8A, a workbench 50 and a connection component fixation jig 60 are used in the optical module manufacturing method according to the third embodiment. The workbench 50 is a table of a flat plate shape that has the monitor 51 and grasp rotation jig 52 on its top surface and that is adapted to implement manufacture of the optical module 1 by means of the connection component fixation jig 60 on the top surface. The workbench 50 may further have the light source 53 (cf. FIG. 3).

The connection component fixation jig 60 can be attached onto and detached from the workbench 50 by an unshown attachment mechanism and has a contact portion 61 which comes into contact with the optical connector 30 to stably fix the optical connector 30. A clamp 62 for temporarily fixing each MCF 10 to the optical connector 30 is integrally provided on the connection component fixation jig 60. The clamp 62 preferably has a structure for holding the projecting parts 10a of the respective MCFs 10 in the coated-fiber part 44 one by one.

In the attachment step, the connection component fixation jig 60 is attached onto the top surface of the workbench 50 by the unshown attachment mechanism. In the mounting fixation step, the optical connector 30 is mounted and fixed through the use of the contact portion 61 onto the connection component fixation jig 60 attached to the workbench 50 in the above attachment step. Then, while using the workbench 50 and connection component fixation jig 60, the arrangement step, array position identification step, and rotational alignment step are executed in the order of these steps named.

In the next temporary fixation step, each MCF 10 after the rotational alignment in the rotational alignment step is temporarily fixed to the optical connector 30 by the clamp 62. This makes it possible to maintain the angle of rotational alignment of the MCF 10. In this regard, each MCF 10 is preferably temporarily fixed by the clamp 62 at a position within 150×D [mm] from the end face 30a of the optical connector 30 outside the interval between the optical connectors 20, 30 and each MCF 10 is more preferably temporarily fixed by the clamp 62 at a position within 100×D [mm]. This offers the advantage that even if there is deviation of the rotational angle of any one of the MCFs 10 in the end face 30a after the temporary fixation, an amount of the deviation can be kept small.

Figure 8B:
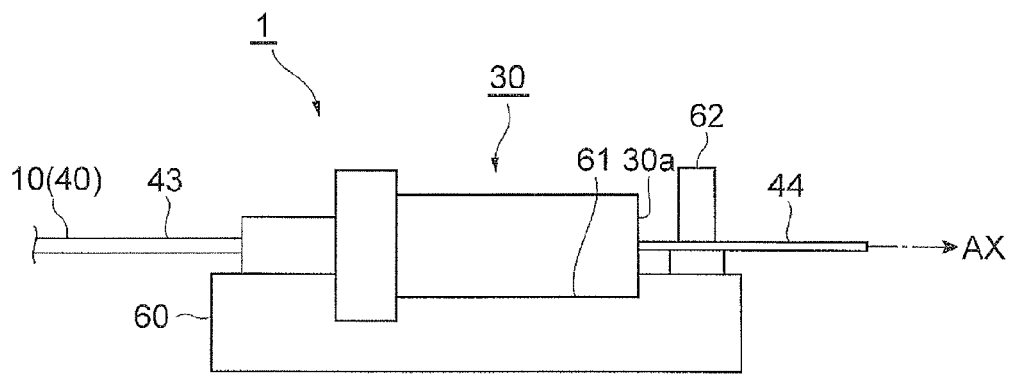
FIG. 8B is a drawing for explaining a detachment step and the fixation step in the optical module manufacturing method according to the third embodiment.

In the detachment step, as shown in FIG. 8B, while the MCFs 10 are temporarily fixed by the clamp 62, the connection component fixation jig 60 is detached together with the optical connector 30 thereon from the workbench 50. Then the temporary fixation by the clamp 62 is released after the fixation step, and the cutting step and end face polishing step are carried out. The temporary fixation by the clamp 62 may be released after execution of the fixation step, cutting step, and end face polishing step.

The present embodiment uses the connection component fixation jig 60 and the clamp 62 integrally provided on the connection component fixation jig 60. This enables the connection component fixation jig 60 to be detached while maintaining the rotational angle of each MCF 10 to the optical connector 30 after the rotational alignment step. Namely, the steps before the rotational alignment step and the steps after the rotational alignment step can be separately performed, which can improve turnover rates of members such as the monitor 51 and grasp rotation jig 52 and which can decrease the number of necessary members. Therefore, the present embodiment can improve productivity and decrease production cost.

The clamp 62 may have a structure for simultaneously holding the projecting parts 10a of the MCFs 10 in the coated-fiber part 44. In this case, while the MCFs 10 each are rotationally aligned, they are temporarily fixed by the clamp 62, so that the angles of rotational alignment thereof are maintained up to the fixation step. Therefore, the fixation step can be performed for the plurality of MCFs 10 together, which can enhance manufacturing efficiency.

REFERENCE SIGNS LIST 1 optical module; 10 MCF (multi-core optical fiber); 11 cores; 13 marker; 20, 30 optical connectors (connection components); 30a end face; 40 MCF assembly (multi-core optical fiber assembly); 42 coating material; 43 coated part; 44 coated-fiber part (single-fiber part, separated part); 50 workbench; 51 monitor; 52 grasp rotation jig; 60 connection component fixation jig; 62 clamp; D outside diameter.

The invention claimed is:

1. A method for manufacturing an optical module which comprises a multi-core optical fiber having a plurality of cores, and first and second connection components attached to the multi-core optical fiber, the method comprising:
   an arrangement step of arranging the first connection component at one end portion of the multi-core optical fiber so that a part of the one end portion projects from the first connection component while the one end portion passes through the first connection component, and arranging the second connection component at the other end portion of the multi-core optical fiber;
   an array position identification step of observing a side face of the projecting part of the multi-core optical fiber, which is included in the one end portion and projects from the first connection component, and identifying array positions of the plurality of cores;
   a mounting fixation step of fixing a position of the first connection component by mounting the first connection component on a connection component fixation jig attached to a workbench equipped with the grasp rotation jig;
   a rotational alignment step, after the mounting fixation step, of grasping the projecting part of the multi-core optical fiber by using a grasp rotation jig, and implementing such rotational alignment of the multi-core optical fiber as to make the array positions of the plurality of cores coincide with predetermined array positions, based on the identification result in the array position identification step;
   a temporary fixation step, after the rotational alignment step, of temporarily fixing the projecting part of the multi-core optical fiber by a clamp provided on the connection component fixation jig;
   a detachment step, after the temporary fixation step, of detaching the connection component fixation jig together with the first connection component from the workbench while the multi-core optical fiber is temporarily fixed by the clamp; and
   a fixation step, after the detachment step, of fixing the multi-core optical fiber to each of the first and second connection components.

2. The method for manufacturing the optical module according to claim 1, wherein the first connection component has a first end face facing the second connection component and a second end face located at a position farther than the first end face is from the second connection component, and
   wherein in the array position identification step, the side face of the projecting part of the multi-core optical fiber is observed at a position within 100×D [mm] from the second end face of the first connection component, where D [mm] represents an outside diameter of a glass part of the multi-core optical fiber.

3. The method for manufacturing the optical module according to claim 1, wherein the first connection component has a first end face facing the second connection component and a second end face located at a position farther than the first end face is from the second connection component, and
   wherein in the temporary fixation step, the projecting part of the multi-core optical fiber is temporarily fixed by a clamp, at a position within 150×D [mm] from the second end face of the first connection component, where D [mm] represents an outside diameter of a glass part of the multi-core optical fiber.

4. The method for manufacturing the optical module according to claim 1,
   wherein the rotational alignment step determines whether the array positions of the plurality of cores coincide with the predetermined array positions, based on an array image of the plurality of cores acquired by imaging the side face of the projecting part of the multi-core optical fiber.

5. The method for manufacturing the optical module according to claim 4,
   wherein the multi-core optical fiber has a marker arranged so as to satisfy a predetermined positional relation to the array positions of the plurality of cores, and
   wherein the array position identification step determines whether a position of the marker identified based on the array image coincides with a position resulting from the rotational alignment of the array positions of the plurality of cores to the predetermined array positions.

6. The method for manufacturing the optical module according to claim 1,
   wherein the multi-core optical fiber is one of a plurality of multi-core optical fiber elements included in a multi-core optical fiber assembly,
   wherein the multi-core optical fiber assembly has a coated part in which outer peripheral surfaces of the respective multi-core optical fiber elements are coated with a coating material, and a separated part in which the plurality of multi-core optical fiber elements are separated from each other while a part of the coating material it removed,
   wherein in the arrangement step, the coated part is arranged between the first and second connection components and the multi-core optical fiber assembly is arranged relative to the first and second connection components so that the separated part projects from the first connection component while passing through the first connection component, and
   wherein the array position identification step and the rotational alignment step are carried out for each of the plurality of multi-core optical fiber elements.

* * * * *